United States Patent
Criscione, II et al.

(10) Patent No.: US 8,622,197 B2
(45) Date of Patent: Jan. 7, 2014

(54) ROTARY SPACING APPARATUS

(75) Inventors: Frank J. Criscione, II, Kansas City, MO (US); Ronnie Lee Avey, Gladstone, MO (US); Oliver Hahn, Parkville, MO (US); Douglas Barnett, Olathe, KS (US); Ryan Foltz, Fairway, KS (US)

(73) Assignee: Baader Linco, Inc., Kansas City, KS (US)

( * ) Notice: Subject to any disclaimer, the term of this patent is extended or adjusted under 35 U.S.C. 154(b) by 72 days.

(21) Appl. No.: 13/358,794

(22) Filed: Jan. 26, 2012

(65) Prior Publication Data

US 2012/0186943 A1    Jul. 26, 2012

Related U.S. Application Data

(60) Provisional application No. 61/436,455, filed on Jan. 26, 2011, provisional application No. 61/451,382, filed on Mar. 10, 2011.

(51) Int. Cl.
    *B65G 47/28*      (2006.01)
(52) U.S. Cl.
    CPC .................................. *B65G 47/28* (2013.01)
    USPC ..... 198/418.6; 198/432; 198/443; 198/459.1; 198/723

(58) Field of Classification Search
    USPC ........... 198/723, 459.1, 443, 432, 418.6, 412, 198/397.03, 393; 221/265; 209/542
    See application file for complete search history.

(56) References Cited

U.S. PATENT DOCUMENTS

| | | | | |
|---|---|---|---|---|
| 1,556,991 | A * | 10/1925 | Hippenmeyer | 198/480.1 |
| 2,500,030 | A * | 3/1950 | Hait | 100/178 |
| 2,667,961 | A * | 2/1954 | Reese et al. | 198/443 |
| 3,642,130 | A * | 2/1972 | Altenpohl | 209/592 |
| 5,673,812 | A * | 10/1997 | Nelson | 221/82 |
| 6,262,377 | B1 * | 7/2001 | Nielsen et al. | 177/1 |
| 6,881,907 | B2 | 4/2005 | Winkelmolen | |
| 8,158,895 | B2 * | 4/2012 | Grundtvig et al. | 177/145 |
| 2006/0243563 | A1 * | 11/2006 | Marti Sala | 198/723 |

* cited by examiner

*Primary Examiner* — Mark A Deuble
(74) *Attorney, Agent, or Firm* — Spencer Fane Britt & Browne LLP (57) ABSTRACT

A spacing apparatus singulates and spaces items for further processing and packaging. The apparatus comprises a rotatable dispensing wheel member having apertures for receiving items, such as food parts. The apertures are configured to place the items in a consistent alignment on a conveyor system. As the dispensing wheel rotates, the items are deposited from the apertures sequentially and with consistent positioning on a conveyor system that transports the singularized items to a measuring point. The rate of rotation of the dispensing wheel member can be controlled by a controller. A guide disposed above the dispensing wheel member provides greater accuracy in depositing items into the slots.

27 Claims, 10 Drawing Sheets

ROTARY SPACING APPARATUS

CROSS-REFERENCE TO RELATED APPLICATIONS

This application claims the benefit of U.S. Provisional Patent Application No. 61/436,455, filed Jan. 26, 2011, and U.S. Provisional Patent Application No. 61/451,382, filed Mar. 10, 2011, which are incorporated herein by reference.

BACKGROUND OF THE INVENTION

The present disclosed technology relates to devices for singulating and spacing items. More specifically, the present disclosed subject matter concerns moving spacing members for substantially fixing distances between food items placed on a conveyor system.

In item processing facilities, items are sorted and packaged according to certain attributes such as weight, size, shape, etc. For example, the attributes of the food items are determined followed by the sorting and packaging of the food items according to one or more of the measured attributes. Apparatuses and methods for determining attributes of food items generally require that a single food items be removed from a bulk loading system at a first location, placed on a conveyor system for transport to a second location, and then moved via the conveyor system to a device for measuring the attribute of each single food item, such as a scale. Thereafter, the single food item is sorted based on its attributes and packaged accordingly.

The process of measuring the attributes of food items is typically carried out by continuously moving machinery, which generally must handle a large number of food items in relatively rapid fashion. The measuring devices in such processes are generally adapted to perform measurements rapidly as the items align with or pass through a measuring point, such as a scale weigh deck. Given the fast-moving, high-volume nature of food processing operations, the potential for error at any point in the process is great because a measurement must take place for each individual food item. An inaccurate measurement may occur when a food item is placed out of alignment with the measuring point, or when multiple food items are not properly separated and, thus, pass the measuring point simultaneously. Inaccurate measurement of food items due to imprecise loading, sorting, and conveying may cause inconsistencies in the resulting sorting and packaging of the food items which can adversely affect business concerns. For example, if the food items are sorted and packaged into a fixed-price packaged food product, and the attributes of the food items in the fixed-price packaged product deviates from the expected norm, the contents of the packaging will not be as expected resulting in dissatisfaction of the customer, and dissatisfaction of the retailer because the profit margin may be less than expected.

SUMMARY

A rotary spacing apparatus is provided for spacing items on a conveyor system in a processing operation so that the items, such as food items, are collected, sorted for measurement and then passed on for further processing such as placement in packaging. In an aspect of the disclosed technology, a picker apparatus transfers food times from a food item storage reservoir to the conveyor system by first placing the food items into a slot in the moving spacing apparatus. The spacing apparatus includes a body, such as a wheel member that rotates about an axis above an engagement plate member. One or more arcuate slots are disposed in a concentric annular fashion about the axis for receiving the food items from the picker apparatus. A back edge of each slot centers the food item as it rotates across the engagement plate member. The food item passes off of the engagement plate member and falls through the slot, by gravity, onto the conveyor system as the back edge of each slot passes over the forward edge of the engagement plate member.

The quantity of food items deposited on the conveyor system may be varied by increasing or decreasing the number of arcuate slots in the spacing apparatus, or by increasing or decreasing the speed the spacing apparatus rotates. In and embodiment of the disclosed subject matter, the rate of rotation of the spacing apparatus is effectuated by a controller.

A guide may be positioned between the picker apparatus and the rotary spacing apparatus for providing greater accuracy in transferring food items from the picker apparatus into the slots.

These and other features, aspects and advantages of the present teachings will become better understood with reference to the following description, examples and appended claims.

DRAWINGS

Those of skill in the art will understand that the drawings, described below, are for illustrative purposes only. The drawings are not intended to limit the scope of the present teachings in any way.

DETAILED DESCRIPTION

The disclosed technology is described with reference to the drawing figures, in which like reference numerals refer to like parts throughout. The disclosed subject matter is used in connection with a high-volume, enhanced-speed food processing systems having a capability to measure individual food products for certain attributes while the items are conveyed by a conveyor system prior to packaging or other processing functions. While such high-volume, enhanced-speed processing systems, and therefore the present disclosed technology, can be used for a wide variety of items, including non-food items, for purposes of illustrating the disclosed technology, the food products described herein may comprise chicken parts, such as wings, legs, breasts, and the like. In particular, the food processing system generally has an ability to measure the weight or size of the food product, whereby food products having attributes meeting predetermined weight or size standards are identified and passed on through the system for further processing according to packaging or other processing functions. The measuring and downstream processing functions of the overall food processing system do not themselves form part of the present disclosed technology, but are referenced herein to provide context to the structure and function of various embodiments of the technology.

Figure 1:
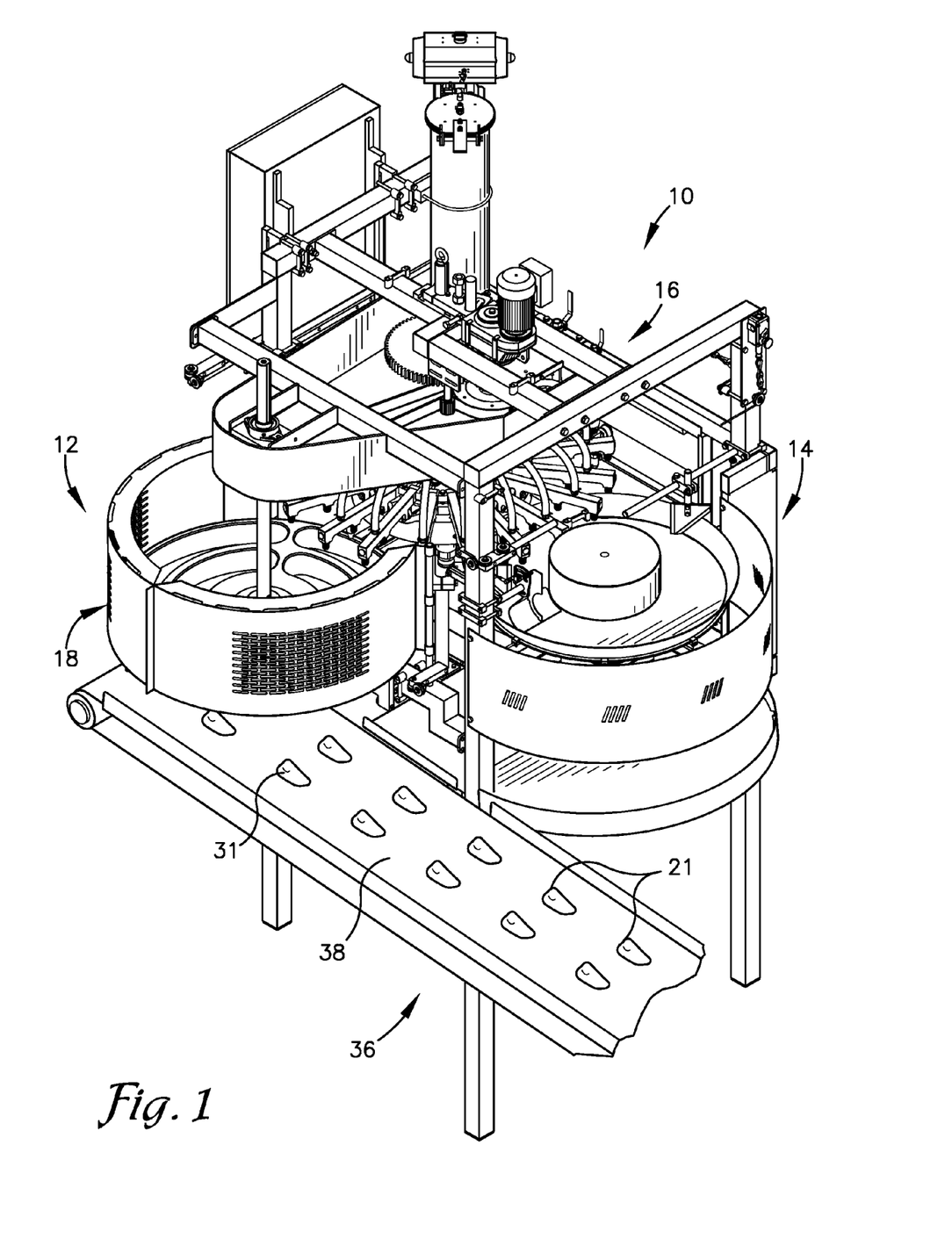
FIG. 1 is a perspective view of the spacing apparatus according to an embodiment of the disclosed technology.

Referring to the drawings, FIG. 1 generally shows a component of an item processing system 10 that may be used in conjunction with the disclosed subject matter. In an embodiment of the disclosed subject matter, the item processing system 10 processes food items, such as chicken parts, and includes a picker apparatus 16 that transfers food items 31 from a food item storage reservoir 14 to a conveyor system 36. The conveyor system 36 transports the food items 31 to a measuring apparatus (not shown) adapted to measure defined attributes of the food items 31. The measuring apparatus for performing the measuring functions can be of the type found in U.S. Pat. No. 6,881,907 to Winkelmolen (2005) the specification of which is incorporated herein by reference. The measuring function is generally carried out as the food items are transported in sequential array along a conveyor belt or other moving device and pass in sequence within the measuring field of the measuring device. Given the high-volume, enhanced-speed nature of the measuring event(s), it is crucial that the food items are placed on the conveyor belt with substantial precision so that an accurate measurement can occur. The measuring device is generally oriented such that it measures an item when it passes a defined position. Measurement of the item may also require that it pass the defined position at a defined time. If the food item is placed out of sequential alignment on the conveyor belt such that it does not precisely pass the defined position, or passes the defined position outside of the defined time, an inaccurate measurement is likely to be made.

An embodiment of the present disclosed technology comprises a spacing apparatus 12 that receives food items 31 from the picker apparatus 16, and that spaces the food items 31 along the conveyor system 36 in a sequential, spaced relationship so the food items 31 may be measured by the measuring apparatus. The picker apparatus 16 transfers food items 31 from the food item storage reservoir 14 to the spacing apparatus 12.

The food item storage reservoir 14 houses food items of various shapes and sizes. The picker apparatus 16 comprises any suitable device for uptake of an individual food item 31 from the food item storage reservoir 14 and release of the individual food items 31 into the spacing apparatus 12. In particular, the picker apparatus 16 includes a plurality of picker elements 30 for uptake and release of food items whereby the picker elements 30 can include vacuum heads, piercing arms, gripper arms, or frozen tip pickup apparatus.

Figure 4:
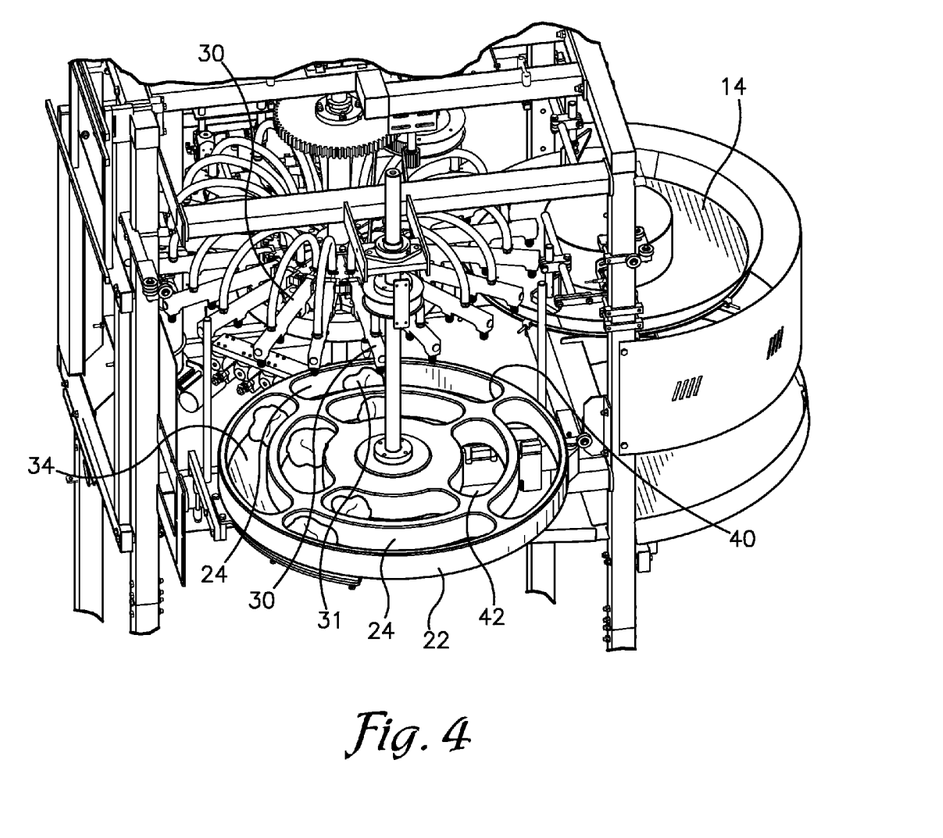
FIG. 4 is a perspective view of the spacing apparatus according to an embodiment of the disclosed technology.
Figure 5:
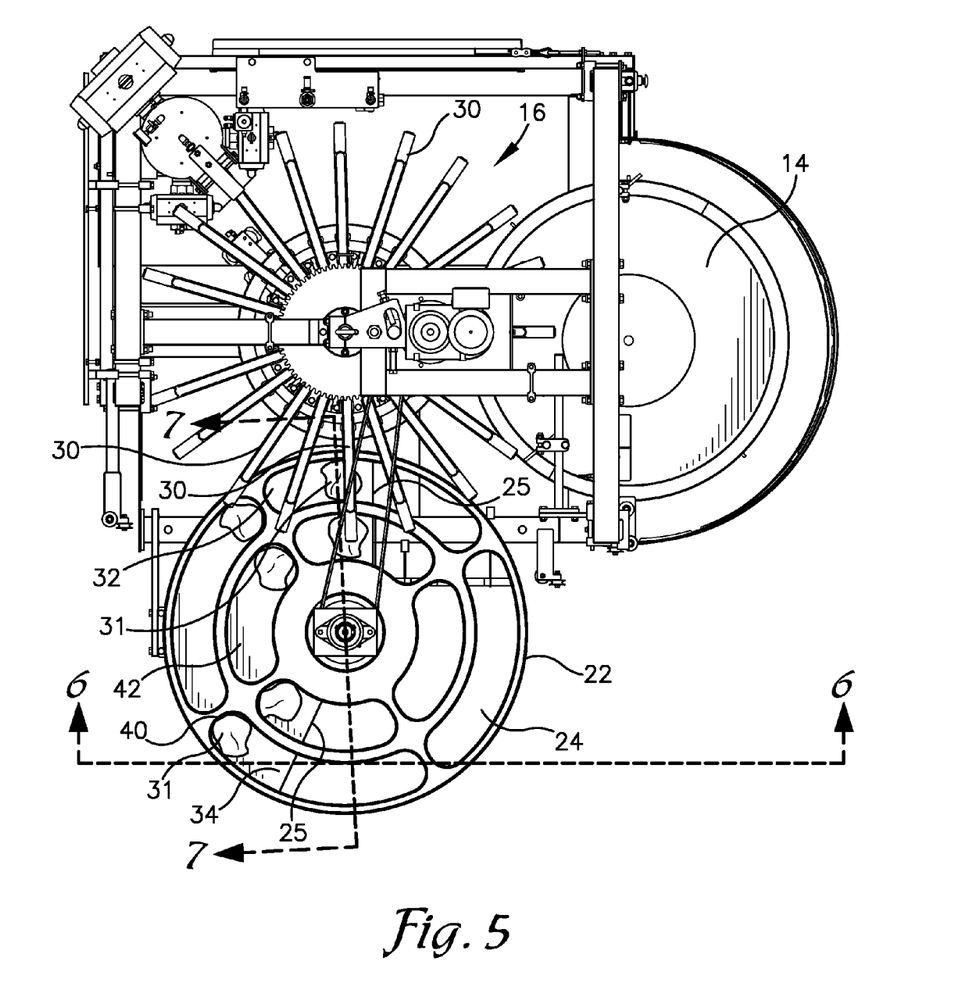
FIG. 5 is a top plan view of the spacing apparatus according to an embodiment of the disclosed technology.
Figure 6:
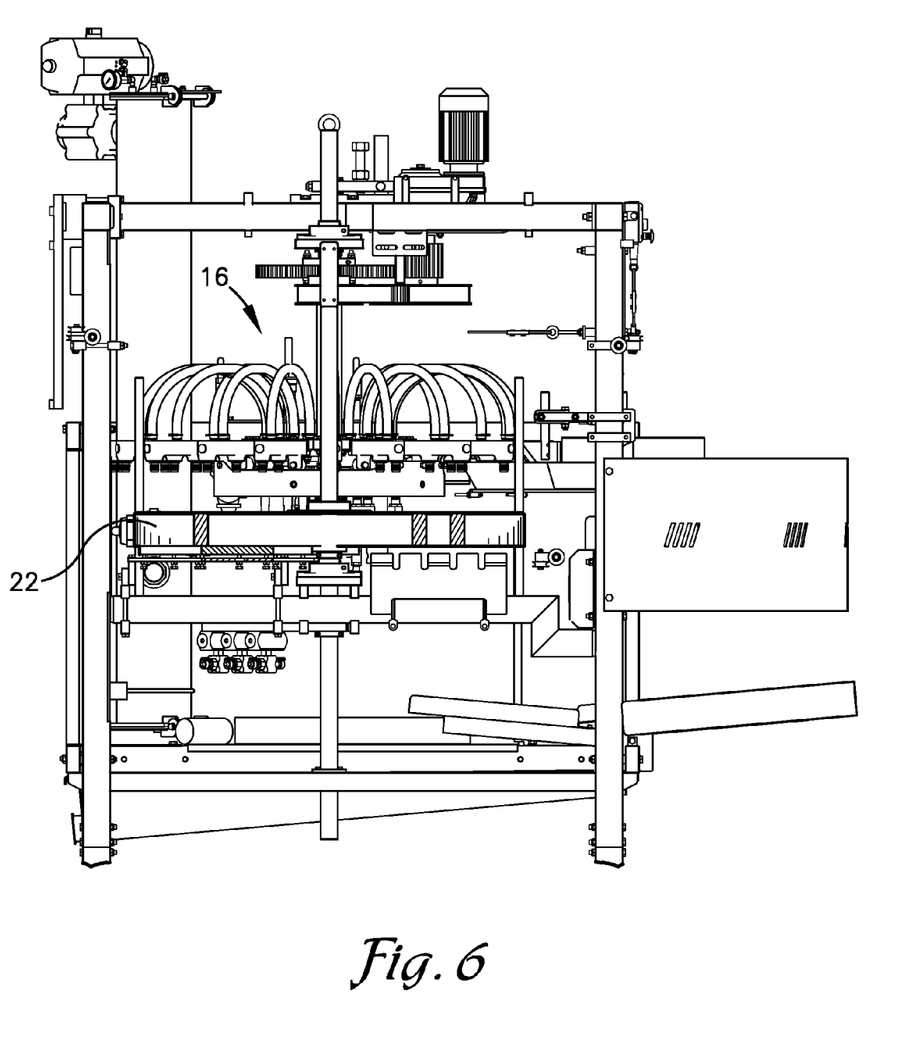
FIG. 6 is a cross-sectional view of the spacing apparatus taken along lines 6-6 in FIG. 5.
Figure 7:
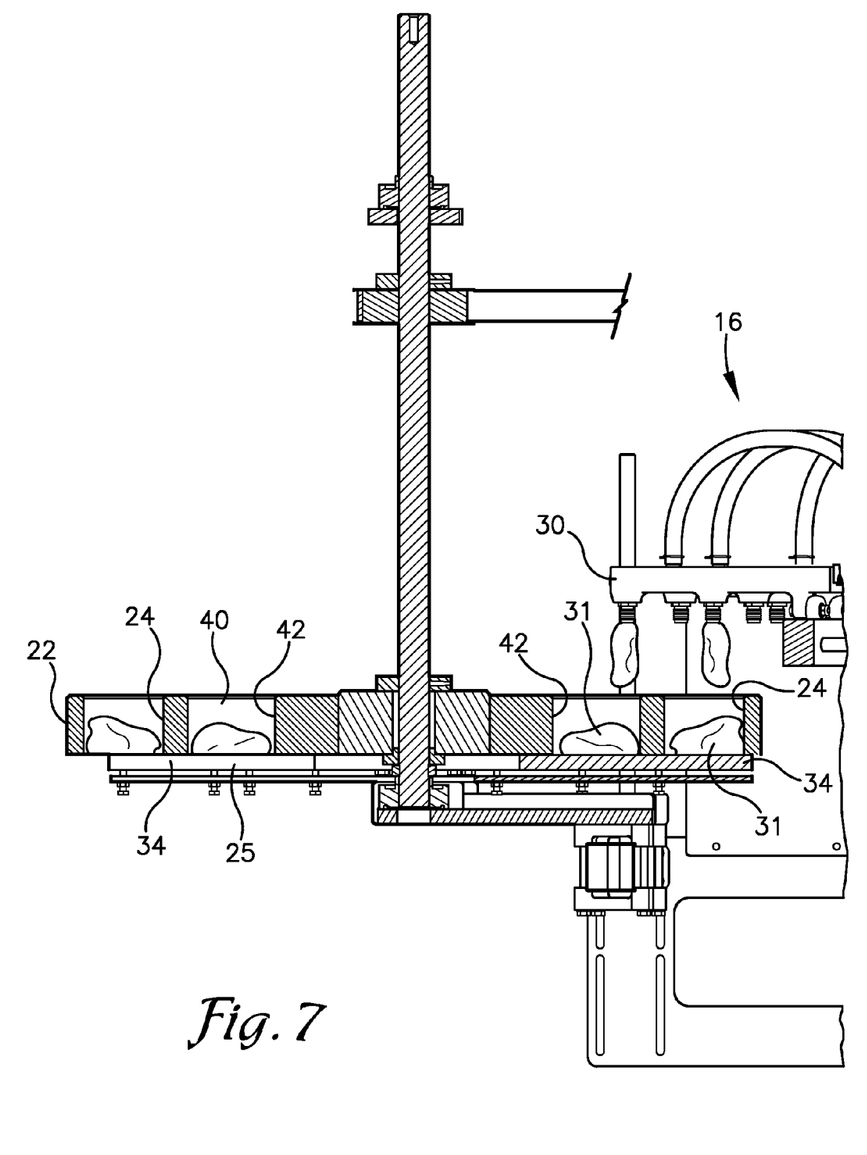
FIG. 7 is a cross-sectional view of the spacing apparatus taken along lines 7-7 in FIG. 5.
Figure 8:
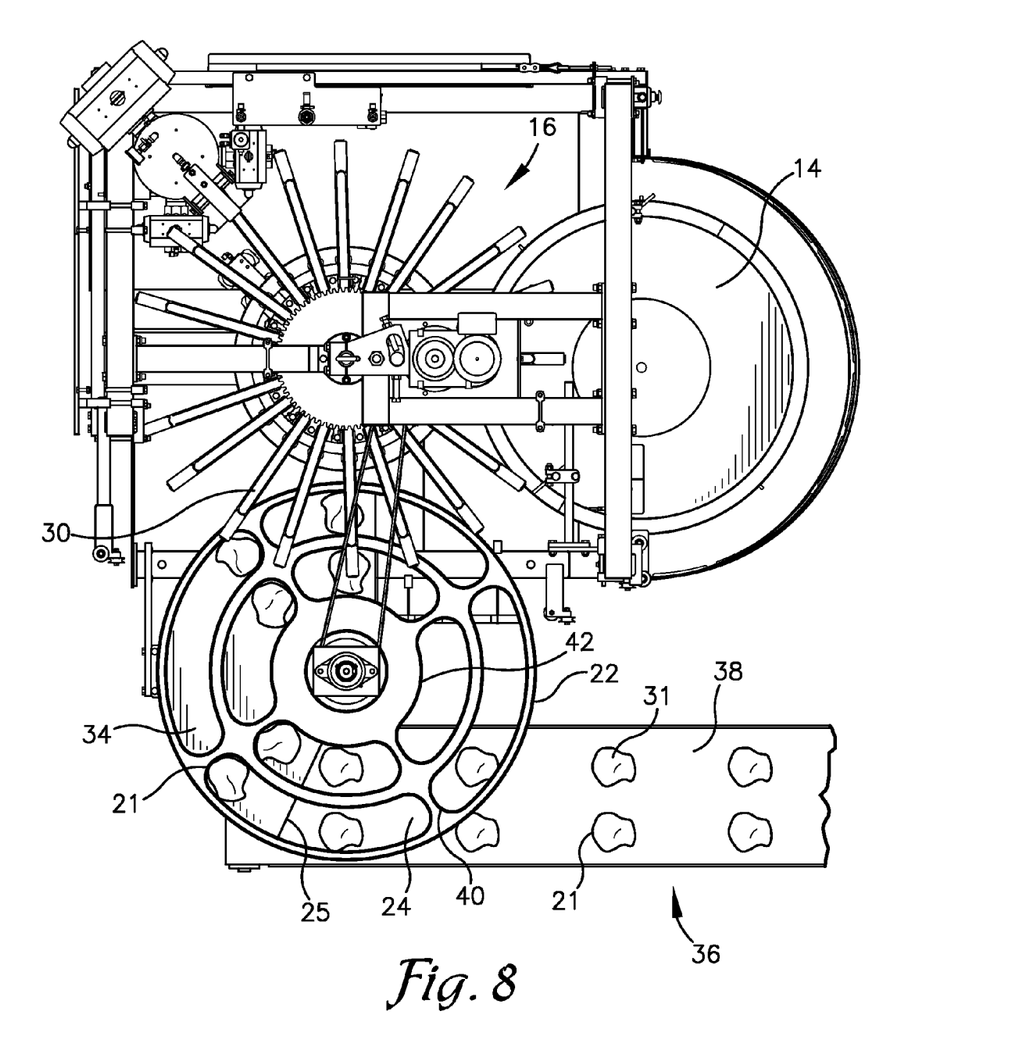
FIG. 8 is a top plan view of the spacing apparatus according to an embodiment of the disclosed technology.

The spacing apparatus 12 generally comprises a body with spacing apertures that passes over the conveyor system 36. The apertures pass from the top surface to the bottom surface of the body. In particular, the body is a cylindrical dispensing wheel member 22 with an axis 26, and the apertures are a series of elongated arcuate slots 24 extending between a front edge 32 and a back edge 40, and are disposed in a concentric annular fashion about the axis 26. The dispensing wheel member 22 rotates about the axis 26 such that the slots 24 revolve in a circular orbit above the conveyor system 36. The picker apparatus 16 is programmed to transfer a single food item 31 into each slot 24 using a picker element 30 as the dispensing wheel member 22 rotates beneath. In an embodiment, the dispensing wheel member 22 rotates counter clockwise. Various controller arrangements for programming the rate at which food items 31 are gathered and released by the picker apparatus 16 are known to those skilled in the art. For example, the embodiment shown in the drawings includes a controller arrangement using a belt and gear drive assembly 28 by which the rate of release of food pieces by the picker apparatus 16 can be coordinated with the rotation of the dispensing wheel member 22 to accurately deposit food items 31 into each slot 24 in the dispensing wheel member 22 as it rotates into position below the release point of the picker element 30 (FIGS. 4-5).

A stationary slide plate or engagement plate member 34 is disposed below, and in close proximity to (e.g., adjacent), the dispensing wheel member 22 for providing support to the food items 31 and to prevent them from initially falling through the slot 24 prior to their release position above the conveyor system 36. The engagement plate member 34 has an upper surface that is only partially coextensive with the bottom surface of the dispensing wheel member 22. As such, the slots 24 move into and out of alignment and overlap with the engagement plate member 34 as the dispensing wheel member 22 rotates. As the slots 24 rotate counter clockwise with a food item 31 deposited therein, and the food item 31 moves to a position beyond a forward edge 25 of the engagement plate member 34, the food piece drops by gravity downward through the slot 24 onto the conveyor belt 38 of the conveyor system 36 below. As each slot 24 rotates over and past the forward edge 25 of the engagement plate member 34, the food items 31 located within are sequentially deposited at a measured rate onto the conveyor system 36. The rate at which the food items 31 are deposited on the conveyor system 36 corresponds to the rate of rotation of the dispensing wheel member 22. The spacing of the food items 31 on the conveyor system 36 relates to the location of the back edge 40 of each slot 24. Because the engagement plate member 34 and the dispensing wheel member 22 are in close proximity to one another, the food items 31 remain within the spacing apertures 24 until the back edge 40 passes the forward edge 25 of the engagement plate member 34.

The back edge 40 of each slot 24 is an arcuate, bilaterally curved surface for guiding the food item 31 into a centralized position within the slot 24 as the dispensing wheel member 22 rotates above the engagement plate member 34. Centering the food item 31 within the slot 24 ensures the food item 31 is deposited in a consistent position on the conveyor system 36 as the back edge 40 of the slot 24 passes over the forward edge 25 of the engagement plate member 34. As such, the trailing edge 21 of each food item 31 is positioned a known distance from the trailing edge 21 of the proceeding food item 31, and the following food item 31.

Accuracy of the placement of the food item 31 is further controlled by minimizing the distance between the engagement plate member 34 and the conveyor system 36 thereby minimizing the deceleration of the food item 31 as they transition from the engagement plate member 34 to the conveyor belt 38. The upper surface of the engagement plate member 34 extends from a forward edge 25 adjacent the release point of the picker apparatus 16 and around in an arch of about one hundred seventy degrees and terminating at another forward edge 25 adjacent the conveyor system 36. In an embodiment, the conveyor system 36 extends away from the spacing apparatus 12 generally parallel to the picker apparatus 16 the food item storage reservoir 14. In alternative embodiments, the forward edge 25 of the engagement plate member 34 is extended or shortened to an arch between about forty five degrees to about two hundred degrees to accommodate a conveyor system that extends away from the picker apparatus 16 and food item storage reservoir 14 at another angle.

The downstream measuring device can be calibrated to perform measurements of the food items 31 on the conveyor system 36 relative to the rate of rotation of the dispensing wheel member 22, the rate of advancement of the conveyor belt 38, or the spatial distances between the back edge 40 of each slot 24. Alternatively, the rate of rotation of the dispensing wheel member 22, the rate of advancement of the conveyor belt 38, or the spatial distances between the back edge 40 of each slot 24 may be calibrated in relation to the rate of measurement by the measuring device.

Figure 2:
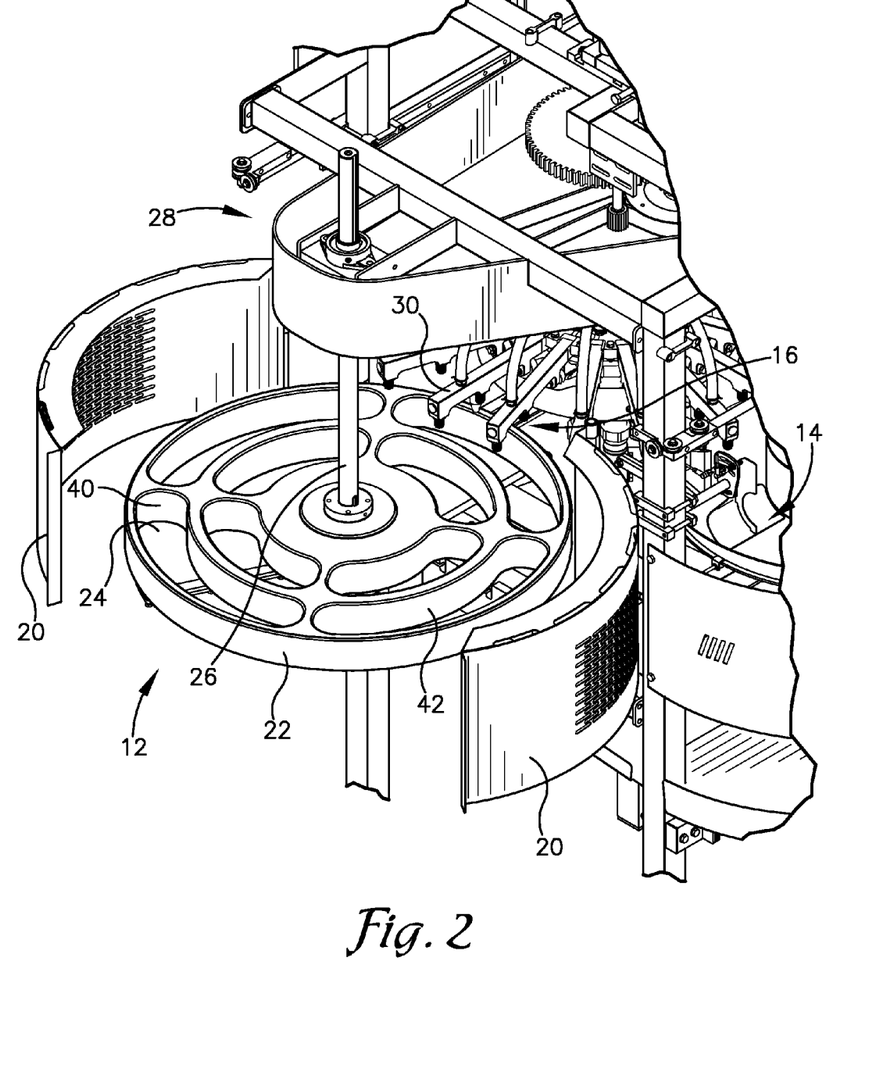
FIG. 2 is a perspective view of the spacing apparatus according to an embodiment of the disclosed technology.

In an embodiment, the dispensing wheel member 22 is operatively connected to a controller for effecting rotational movement. FIG. 2 shows the dispensing wheel member 22 driven by a shaft 26 which is connected to a belt and gear drive assembly 28. Alternatively, the shaft 26 may be driven directly by a motor. Where rotation of dispensing wheel member 22 is driven at a cooperative rate with that of the picker apparatus 16, the belt and gear drive assembly 28 may be arranged to simultaneously operate the picker apparatus 16 and dispensing wheel member 22. Appropriate gearing may be provided to affect different rates of rotation of the dispensing wheel member 22 and picker apparatus 16, respectively, to control the relative rates of feeding food items 31 to the spacing apparatus 12. Factors assessed in determining the appropriate rate of rotation of dispensing wheel member 22 include: 1) the measuring rate capability of the downstream measuring device; 2) the speed of the conveyor belt 38 conveying items to the measuring device; or 3) the distance between back edge 40 of the slots 24 in the dispensing wheel member 22. The dispensing wheel member 22 can be configured with varying number of slots 24 where for a given rate of rotation, the number of slots 24 may affect the desired rate of rotation in that, the greater the number of slots 24 the faster the rate of sequentially deposited food items 31. These known variables can be mathematically combined to achieve the appropriate rate of rotation of the dispensing wheel member 22 to yield the desired spacing of food items 31 deposited on the conveyor system 36.

In an embodiment, the dispensing wheel member 22 can be configured to have multiple slots depending on the desired rate and volume of food items to be processed. A dual array of slots can be provided in the dispensing wheel member 22, with a first set of slots 24 at an outer annular position and a second set of slots 42 at an inner annular position. With the additional laterally spaced slots, the spacing apparatus 12 is able to accommodate multiple food items 31 from the picker apparatus 16. Because the slots 42 are in an inner portion of the dispensing wheel member 22 compared to slots 24, the slots 42 travel a shorter distance and speed across the engagement plate member 34 than slots 24. Therefore, in order for the food items 31 to be accurately placed on the conveyor belt 38, the engagement plate member 34 is configured with an angled forward edge 25 so that the food items 31 are dispensed from the spacing apparatus 12 is a staggered manner.

Figure 3:
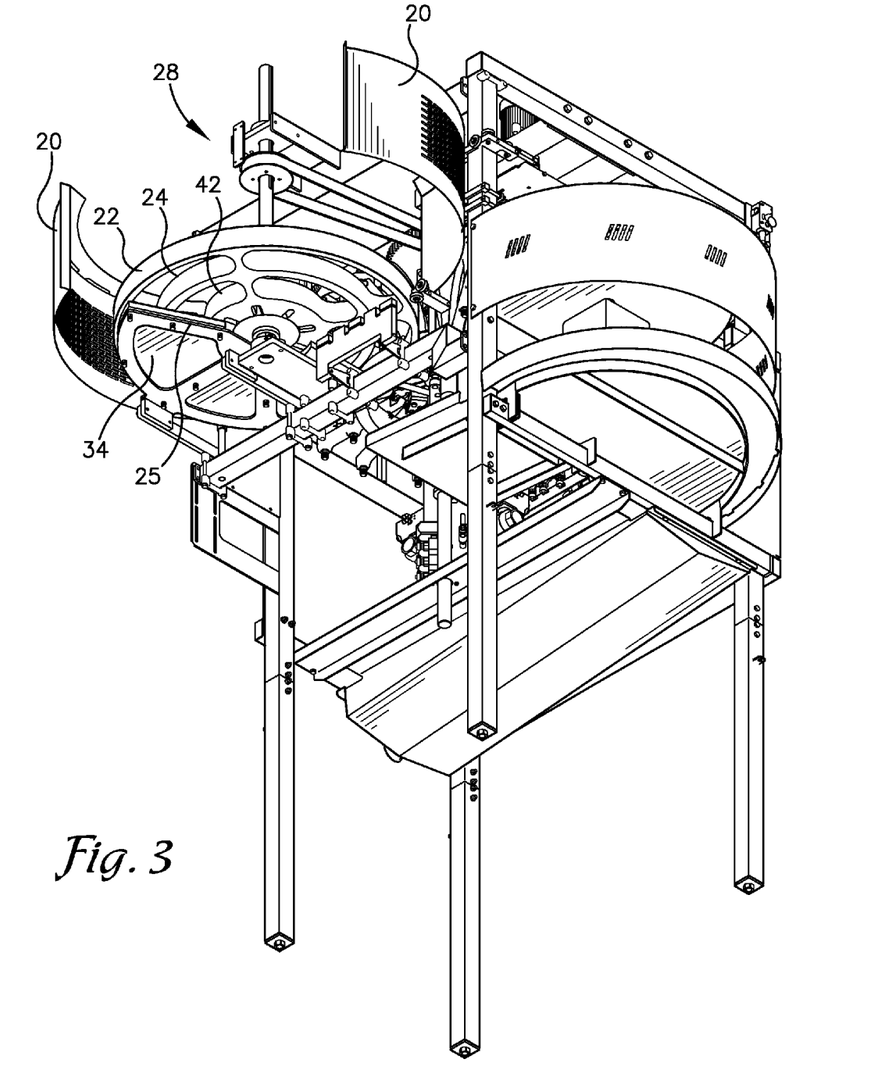
FIG. 3 is a perspective view taken from the bottom of the spacing apparatus according to an embodiment of the disclosed technology.

In another embodiment, the spacing apparatus 12 includes a cylindrical bin 18 with walls 20 to keep the food items 31 from falling out of the spacing apparatus 12 before they can be singularized. The repeated handling of raw food items 31, such as chicken parts, can create a substantial buildup of blood, grease, flesh, and the like. Therefore, the walls 20 can be designed to pivot, as seen in FIG. 3, and swing away or be removed to allow cleaning of the bin 18, spacing apparatus 12, or the picker apparatus 16.

Figure 9:
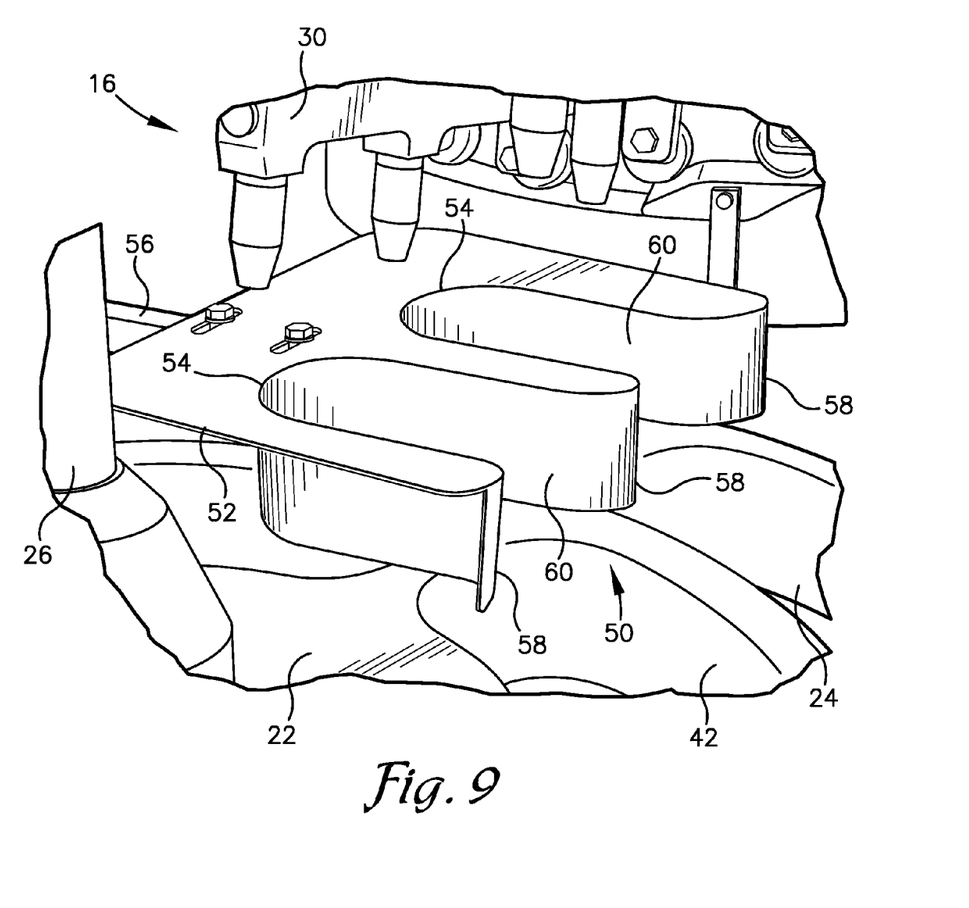
FIG. 9 is a perspective view of the guide.
Figure 10:
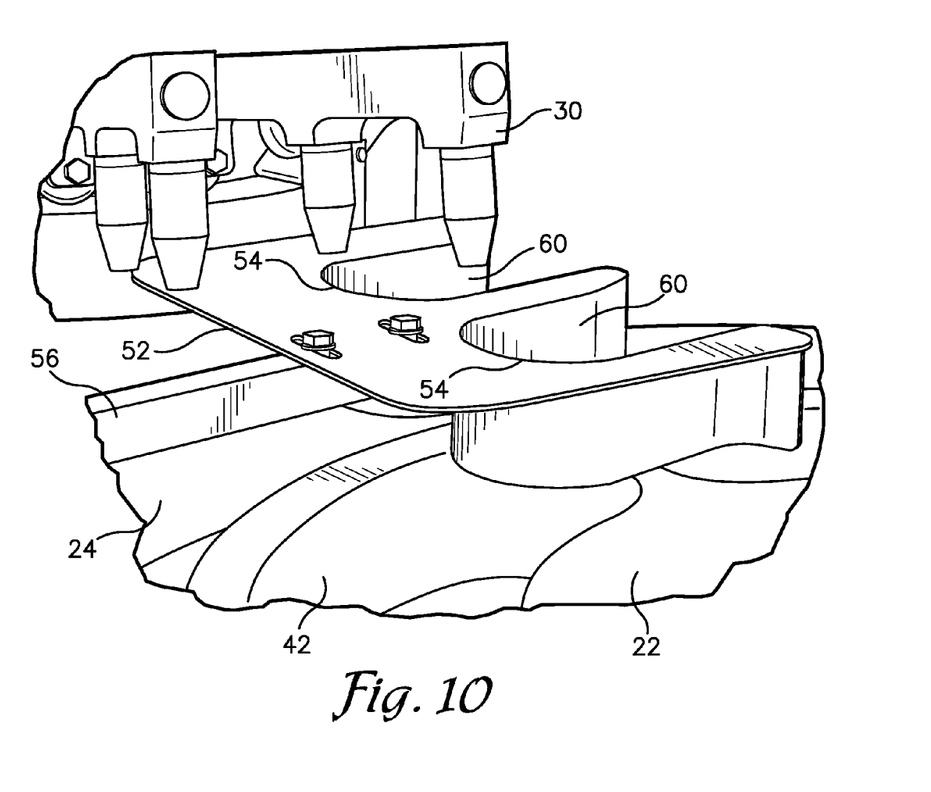
FIG. 10 is a perspective view of the guide.

In another embodiment, a guide is provided for ensuring that food items 31 are properly deposited in the slots in the dispensing wheel member 22. An embodiment of a food item 31 depositing guide 50 is shown in FIGS. 9 and 10 in use with a dispensing wheel member having both inner slots 42 and outer slots 24. The guide 50 is disposed between the picker apparatus 16 and the dispensing wheel member 22 to direct food items 31 released from the picker apparatus 16 into the slots 42, 24. Because the picker apparatus 16 can remove food items 31 from the food item storage reservoir 14 at such a rapid pace, the food items 31 may be released from the picker element 30 whereby their path of decent may deviate from a decent straight down such that they may fall outside the slots 24 and 42. In the embodiment show in FIGS. 9 and 10, a guide 50 is shown comprising a guide member 52 with at least one channel 54. The width of channel 54 should have a sufficient dimension to catch a deposited food item 31 that may be swinging back and forth at the point where it is released from the picker apparatus 16. Similarly, the length of channel 54 should be of a sufficient dimension to catch a deposited food item 31 that may be swinging back and forth in that relative direction.

The guide 50 is stationary with respect to the rotation of both the picker apparatus 16 and the dispensing wheel member 22. As shown in FIG. 10, the guide 50 is mounted in a position on mounting arm 56. When the dispensing wheel member 22 is provided with a dual array of slots 24 and 42, the guide 50 may have dual channels 54, one each in alignment with the each of the slot arrays. The channel 54 may comprise side walls 60 having a depth, such as an inch or more to guide the dropping items into a straight descent into the slots 24 and 42. The front edges 58 of the guide member 52 may be curved to catch and urge in food items 31 that may fall just outside of the width of the front of the channel 54.

The many features and advantages of the disclosed subject matter are apparent from the detailed specification, and thus, it is intended by the appended claims to cover all such features and advantages of the technology which fall within the true spirit and scope of the disclosed subject matter. Further, since numerous modifications and variations will readily occur to those skilled in the art, it is not desired to limit the technology to the exact construction and operation illustrated and described, and accordingly, all suitable modifications and equivalents may be resorted to, falling within the scope of the disclosed subject matter.

What is claimed is:

1. A spacing apparatus for sequentially placing items on a conveyor system, the spacing apparatus comprising:
   a dispensing wheel member including a top surface and a bottom surface, and rotatable about an axis;
   a plurality of arcuate slots passing between the top surface and the bottom surface of the dispensing wheel member wherein each aperture is adapted for receiving and dispensing an item;
   an engagement plate member positioned adjacent the bottom surface of the dispensing wheel member, the engagement plate member being partially coextensive with the bottom surface of the dispensing wheel member thereby preventing the items from passing beyond the bottom surface of the dispensing wheel member; and
   a controller for operatively rotating the dispensing wheel member at a speed with respect to the engagement plate member.

2. The spacing apparatus of claim 1, wherein:
   the engagement plate member includes a forward edge positioned adjacent the bottom surface of the dispensing wheel member;
   the apertures are disposed in the dispensing wheel member in an annular configuration about the axis; and the controller rotates the dispensing wheel member at a consistent speed such that the apertures sequentially move at a consistent rate above the forward edge.

3. The spacing apparatus of claim 2, wherein the speed of rotation of the dispensing wheel member is variable to control the spacing distance of the items dispensed from the dispensing wheel on the conveyor system.

4. The spacing apparatus of claim 2, wherein the aperture includes a back edge, and rotation of the dispensing wheel member positions the item at the back edge orientating the item in a centralized position within the aperture.

5. The spacing apparatus of claim 1, wherein the item is dispensed onto the conveyor system when the aperture carrying the item rotates out of alignment with the engagement plate member.

6. The spacing apparatus of claim 5, wherein the engagement plate member includes a forward edge defining a dispensing position of the spacing apparatus.

7. The spacing apparatus of claim 1, wherein the dispensing wheel member further includes:
a first set of arcuate slots at an outer annular position; and
a second set of arcuate slots at an inner annular position.

8. The spacing apparatus of claim 1, wherein each arcuate slot includes a back edge, and rotation of the dispensing wheel member positions the item at the back edge, the back edge having a curved surface for orientating the item in a centralized position within the slot.

9. The spacing apparatus of claim 1, wherein the dispensing wheel member sequentially dispenses items from each slot onto the conveyor system from the dispensing position whereby the items are spaced consistently from one another on the conveyor system.

10. The spacing apparatus of claim 1, wherein the item is dispensed from the aperture by gravity.

11. The spacing apparatus of claim 1, further including a guide member positioned above the dispensing wheel member for guiding items into the apertures.

12. The spacing apparatus of claim 11, wherein the guide member further includes a channel aligned with the apertures for guiding the items into the apertures.

13. A food item processing system, comprising:
a food item reservoir containing food items;
a spacing apparatus, comprising:
a dispensing wheel member including a top surface and a bottom surface, and rotatable about an axis;
a plurality of apertures disposed in the dispensing wheel member in an annular configuration about the axis, the apertures passing between the top surface and the bottom surface of the dispensing wheel member wherein each aperture is adapted for receiving and dispensing the food item;
an engagement plate member positioned adjacent the bottom surface of the dispensing wheel member, the engagement plate member including a forward edge defining a dispensing position, and being partially coextensive with the bottom surface of the dispensing wheel member thereby preventing the food items from passing beyond the bottom surface of the dispensing wheel member; and
a controller for operatively rotating the dispensing wheel member at a consistent speed with respect to the engagement plate member such that the apertures sequentially move at a consistent rate above the forward edge;
a picker apparatus positioned above the dispensing wheel member for transferring food items from the food item reservoir into the apertures wherein the food item contacts the engagement plate member within the aperture; and
a conveyor system positioned below the engagement plate forward edge for receiving food items dispensed from the dispensing wheel member when an aperture carrying a food item rotates out of engagement with the engagement plate member.

14. The food item processing system of claim 13, wherein the speed of rotation of the dispensing wheel member is variable to control the spacing distance of the food items dispensed onto the conveyor system.

15. The food item processing system of claim 13, wherein the apertures include a back edge, the back edge orientating the food item in a centralized position within the aperture.

16. The food item processing system of claim 15, wherein the dispensing wheel member further includes:
a first set of arcuate slots at an outer annular position; and
a second set of arcuate slots at an inner annular position.

17. The food item processing system of claim 16, wherein the food items received on the conveyer system are staggered.

18. The food item processing system of claim 13, wherein each aperture is an arcuate slot, and each arcuate slot includes a back edge having a curved surface for orientating the food item in a centralized position within the slot.

19. The food item processing system of claim 13, wherein the dispensing wheel member sequentially dispenses food items from each aperture onto the conveyor system from the dispensing position whereby the items are spaced consistently from one another on the conveyor system.

20. The food item processing system of claim 13, wherein the food item is dispensed from the aperture by gravity.

21. The food item processing system of claim 13, further including a guide member positioned above the dispensing wheel member for guiding the food items into the apertures.

22. The food item processing system of claim 21, wherein the guide member further includes a channel aligned with the apertures for guiding the food items into the apertures.

23. A spacing apparatus for sequentially placing items on a conveyor system, the spacing apparatus comprising:
a dispensing wheel member including a top surface and a bottom surface, and rotatable about an axis;
a plurality of arcuate slots disposed in the dispensing wheel member in an annular configuration about the axis, each slot passing between the top surface and the bottom surface of the dispensing wheel member wherein each slot is adapted for receiving and dispensing the item, each slot including a back edge whereby rotation of the dispensing wheel member positions the item at the back edge orientating the item in a centralized position within the slot;
an engagement plate member positioned adjacent the bottom surface of the dispensing wheel member, the engagement plate member including a forward edge defining a dispensing position, and being partially coextensive with the bottom surface of the dispensing wheel member thereby preventing the items from passing beyond the bottom surface of the dispensing wheel member; and
a controller for operatively rotating the dispensing wheel member at a consistent speed with respect to the engagement plate member such that when the back edge of a slot containing an item passes over the forward edge of the engagement plate member the item drops by gravity from the slot onto the conveyor system whereby the items are spaced consistently from one another on the conveyor system.

24. The spacing apparatus of claim 23, wherein the speed of rotation of the dispensing wheel member is variable to control the spacing distance of the items dispensed from the dispensing wheel on the conveyor system.

25. The spacing apparatus of claim 23, further including a guide member positioned above the dispensing wheel member for guiding the items into the slots.

26. The spacing apparatus of claim 25, wherein the guide member further includes a channel aligned with the apertures for guiding the items into the slots.

27. The spacing apparatus of claim 23, wherein the dispensing wheel member further includes:
    a first set of arcuate slots at an outer annular position; and
    a second set of arcuate slots at an inner annular position.

\* \* \* \* \*